(12) United States Patent
Sonai et al.

(10) Patent No.: US 7,648,790 B2
(45) Date of Patent: Jan. 19, 2010

(54) ELECTROLYTE FOR FUEL CELL AND FUEL CELL EMPLOYING THE SAME

(75) Inventors: Atsuo Sonai, Yokohama (JP); Toshihiko Matsuda, Chudoji Minami-machi (JP)

(73) Assignee: Samsung SDI Co., Ltd., Suwon (KR)

( * ) Notice: Subject to any disclaimer, the term of this patent is extended or adjusted under 35 U.S.C. 154(b) by 820 days.

(21) Appl. No.: 11/188,780

(22) Filed: Jul. 26, 2005

(65) Prior Publication Data

US 2006/0025520 A1    Feb. 2, 2006

(30) Foreign Application Priority Data

Jul. 27, 2004    (JP)    ............................. 2004-218928
Dec. 23, 2004   (KR)   ....................... 10-2004-0111373

(51) Int. Cl.
*H01M 8/10* (2006.01)
*H01M 8/00* (2006.01)
*C08G 18/08* (2006.01)

(52) U.S. Cl. ............................. 429/33; 429/30; 429/12; 534/589

(58) Field of Classification Search ................... 429/33, 429/30, 12
See application file for complete search history.

(56) References Cited

FOREIGN PATENT DOCUMENTS

| JP | 8-504293 | | 5/1996 |
|---|---|---|---|
| JP | 2001-229730 | * | 8/2001 |
| JP | 2002-280019 | | 9/2002 |
| JP | 2002-358978 | | 12/2002 |

* cited by examiner

*Primary Examiner*—Patrick Ryan
*Assistant Examiner*—Angela J. Martin
(74) *Attorney, Agent, or Firm*—H.C. Park & Associates, PLC

(57) ABSTRACT

An electrolyte for a fuel cell comprising a proton conducting resin comprising a backbone comprising a polyurea resin and side chains that comprise an active hydrogen group at a terminal and a fuel cell employing the same are provided. The electrolyte has improved proton conductivity, heat resistance, and mechanical strength.

9 Claims, No Drawings

ELECTROLYTE FOR FUEL CELL AND FUEL CELL EMPLOYING THE SAME

CROSS REFERENCE TO RELATED APPLICATIONS

This application claims priority to and the benefit of Japanese Patent Application No. 2004-218928, filed on Jul. 27, 2004, in the Japanese Intellectual Property Office, and the benefit of Korean Patent Application No. 10-2004-0111373, filed on Dec. 23, 2004, in the Korean Intellectual Property Office, the disclosures of which are incorporated herein in their entirety by reference.

BACKGROUND OF THE INVENTION

1. Field of the Invention

The present invention relates to an electrolyte for a fuel cell that has improved proton conductivity, heat resistance, and mechanical strength, and a fuel cell employing the same.

2. Description of the Background

Due to the reduction in available global energy resources, the development and use of clean energy is required all over the world. For example, the development of transportation networks and the increase in the number of vehicles have brought about serious air pollution problems due to exhaust gases of internal combustion engines of automobiles. Electric automobiles are being developed to solve these problems. For example, a lightweight fuel cell that can be handled easily and does not contaminate the air may be used as an energy source for automobiles. The fuel cell may also be used as an energy source in home settings.

Fuel cells can be classified into categories including alkaline fuel cells, phosphoric acid fuel cells, molten carbonate fuel cells, solid polymer electrolyte fuel cells, solid polymer fuel cells, and the like, depending on the type of electrolyte used. The solid polymer electrolyte fuel cell, which is operable at low temperatures, can be handled easily, and has high output power, is emerging as a leading energy source for electric automobiles, homes, and the like.

A proton conducting membrane that is used for solid polymer electrolyte fuel cells should have high ionic conductivity for protons that are involved in an electrode reaction of a fuel cell. For example, a fluorine-based polymer containing a superacid group has been used as a proton conducting membrane, but is very expensive. In addition, since a possible proton conducting medium is water, water should be supplied by continuous humidification.

Japanese Patent Publication No. 2002-280019 and No. 2002-358978 disclose a proton conducting membrane comprising an ion dissociating group such as a carboxylic acid group, a sulfonic acid group, and a phosphate group in an aromatic skeleton. However, such an ion dissociating group may easily separate at high temperatures, and the proton conducting membrane may have poor flexibility and proton conductivity. In addition, Japanese Patent Laid-Open Publication No. Hei 8-504293 includes a similar description, but does not disclose proton conductivity.

Furthermore, a method exists for introducing an active hydrogen group by reacting polybenzimidazole with sultone. However, this method can introduce only a sulfonic acid group and may not be applied to other active hydrogen groups.

SUMMARY OF THE INVENTION

The present invention provides an electrolyte for a fuel cell that has good proton conductivity, heat resistance, and mechanical strength, and a fuel cell that includes the electrolyte.

Additional features of the invention will be set forth in the description which follows, and in part will be apparent from the description, or may be learned by practice of the invention.

The present invention discloses an electrolyte for a fuel cell comprising a proton conducting resin that has a backbone that comprises a polyurea resin and side chains that comprise an active hydrogen group at a terminal.

The present invention also discloses a fuel cell that includes a cathode, an anode, and the above electrolyte interposed between the cathode and the anode.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

The electrolyte membrane of the present invention comprises a proton conducting resin that has a backbone that comprises a polyurea resin and side chains that comprise an active Is hydrogen group at a terminal to provide proton conductivity. According to this structure, an electrolyte membrane for a fuel cell that has good proton conductivity, heat resistance, and mechanical strength can be obtained. A fuel cell comprising the electrolyte membrane of the present invention has improved power generating properties.

The polyurea resin backbone has good heat resistance and chemical resistance and can increase the heat resistance and mechanical strength of the electrolyte membrane of a fuel cell.

The polyurea resin comprises at least one of a urea group and a urethane group in its molecular structure, depending on its monomer. The urea group and the urethane group have an active hydrogen that is bound to their nitrogen atoms. In addition, a sultone compound may be chemically bound to one or both of the urea group and the urethane group in the polyurea resin.

The polyurea resin is obtained, for example, by a reaction of polyisocyanate with polyamine.

The polyisocyanate may include, but is not limited to a compound having an aromatic ring such as toluene diisocyanate, diphenylmethane diisocyanate (MDI), xylene diisocyanate, naphthalene diisocyanate, and the like, an alicyclic compound such as isophorone diisocyanate, cyclohexane diisocyanate, and the like, and an aliphatic compound such as hexamethylene diisocyanate, tolylene diisocyanate and the like. The derivatives of these compounds may also be used.

These polyisocyanates may be used in combination if necessary. The NCO% of the polyisocyanate is commonly in the range of about 20-48 mol %, and preferably about 25-48 mol %. If the NCO index is out of this range, the heat resistance and mechanical strength of the electrolyte membrane may decrease.

Examples of the polyamine may include, but are not limited to aliphatic diamines such as ethylene diamine and propylene diamine, alicyclic diamines such as isoprene diamine, and aromatic diamine such as polytetramethyleneoxide-di-P-aminobenzoate, 4,4'-diamino-3,3'-diethylamino-5,5'-diaminodiphenylmethane, 2,2',3,3'-tetrachloro-4,4'-diaminodiphenylmethane, 3,3'-dichloro-4,4'-diaminodiphenylmethane, trimethylene-bis(4-aminobenzoate), and 3,5'-dimethylthiotoluenediamine. These compounds may also be used in combination with each other. Among these polyamines, aromatic diamine is preferable and polyalkyleneoxide-di-P-aminobenzoate is particularly preferable. An amine value is commonly in the range of 28-200, and preferably 28-150. When the amine value is out of this range, heat resistance of the electrolyte membrane decreases.

The reaction of polyisocyanate with polyamine typically has an NCO index of 90-110, and preferably 95-105. When the NCO index is out of this range, an electrolyte membrane with good heat resistance and mechanical strength cannot be obtained.

In the electrolyte membrane, an acryl isocyanate compound is chemically bound to one or both of a urea group and a urethane group in the polyurea resin. In addition, an active hydrogen group comprising an acrylate compound is chemically bound to the chemically bound acryl isocyanate compound.

The acryl isocyanate compound comprises a methacryl isocyanate compound that has a methyl group at an α-position. Examples of the acryl isocyanate compound may include 2-methacryloyloxyethyl isocyanate, MOI (2-isocyanatoethyl methacrylate), for example, but is not limited thereto.

The active hydrogen group comprising acryl isocyanate compound of the electrolyte membrane also comprises an active hydrogen group comprising a methacryl isocyanate compound that has a methyl group at an α-position. The active hydrogen group may include, but is not limited to a sulfonic acid group, a carboxylic acid group, a phosphoric acid group, and a hydroxyl group. The sulfonic acid group and the phosphoric acid group are particularly preferable. If the active hydrogen group is a hydroxyl group, the hydroxyl group is bound to a polyoxyalkylene chain.

Examples of the active hydrogen group comprising acrylate may include, but are not limited to sulfonic acid group containing compounds such as 2-acrylamide-2-methylpropanesulfonic acid (TBAS) and stylenesulfonic acid, carboxylic acid group containing compounds such as acrylic β-methacryloyloxyethyl hydrogen succinate and β-methacryloyloxyethyl hydrogen phthalate, phosphoric acid group containing compounds such as mono(2-acryloyloxyethyl)added phosphate and mono(2-methacryloyloxyethyl)added phosphate, and hydroxyl group containing compounds such as monofunctional polyethyleneglycol mono(meth)acrylate, polypropyleneglycol mono(meth)acrylate, difunctional polyoxyalkylenediglycol mono(meth)acrylate, and trifunctional polyoxyalkylenetriglycol mono(meth)acrylate. Among these compounds, difunctional and trifunctional compounds are preferable.

The proton conducting resin comprising a backbone comprising a polyurea resin and side chains comprising an active hydrogen group is formed by polymerizing the acryl isocyanate compound, which has a carbon double bond, with the active hydrogen group comprising the acrylate compound, which also has a carbon double bond. The active hydrogen group is located at a terminal of the formed side chain.

As shown in Reaction Scheme 1, the reaction of the urea group (1) and/or urethane group of the polyurea resin with the acryl isocyanate compound (2) may be performed in the presence of a solvent by a well-known reaction. Dimethylformamide, dimethylsulfoxide, dimethylacetamide, and the like are preferably used as the solvent. If necessary, a catalyst for forming an urethane such as a tin (Sn) compound may be used.

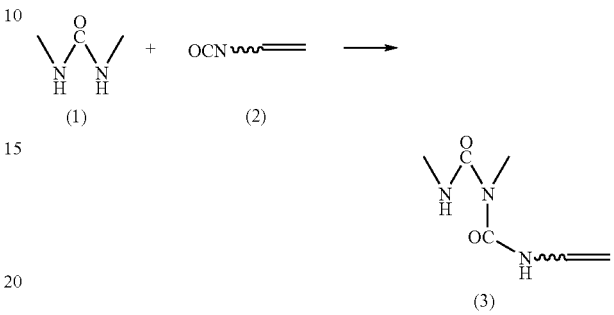

As shown in Reaction Scheme 2, the reaction product 3 of the urea group and/or urethane group of the polyurea resin with the acryl isocyanate compound may be reacted with the active hydrogen group comprising acrylate compound 4 through well-known thermal polymerization and/or UV polymerization to form the proton conducting resin 5. UV polymerization is preferably used.

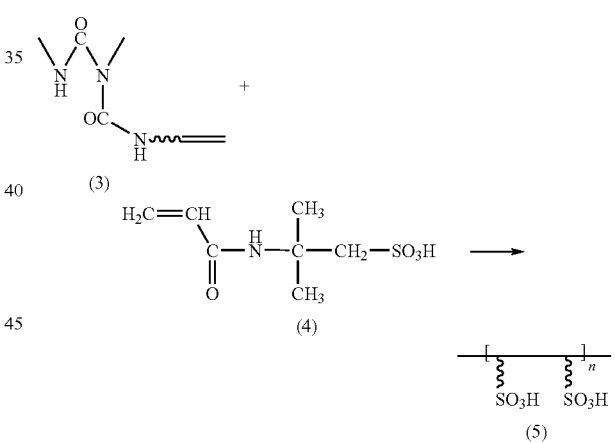

Referring to the proton conducting resin 5, n is a number between 1 and 100.

When the active hydrogen group is a sulfonic acid group, it may also be introduced to one or both of the urea group and the urethane group of the polyurea resin by reacting a sultone compound, as shown in Reaction Scheme 3. Specifically, sodium hydride is added to the polyurea resin 6 to obtain a compound 7 where the active hydrogen bound to nitrogen of the urea group or urethane group is replaced with sodium. Then, the compound 7 is reacted with the sultone compound 8 to open the sultone compound to chemically bind it to the urea resin 9 as a side chain. Then, an acid is added to the urea resin 9 to form a sulfonic acid group 10 derived from the sultone compound at a terminal of the side chain. The sultone compound may be (alkyl)propanesultone or butanesultone, for example.

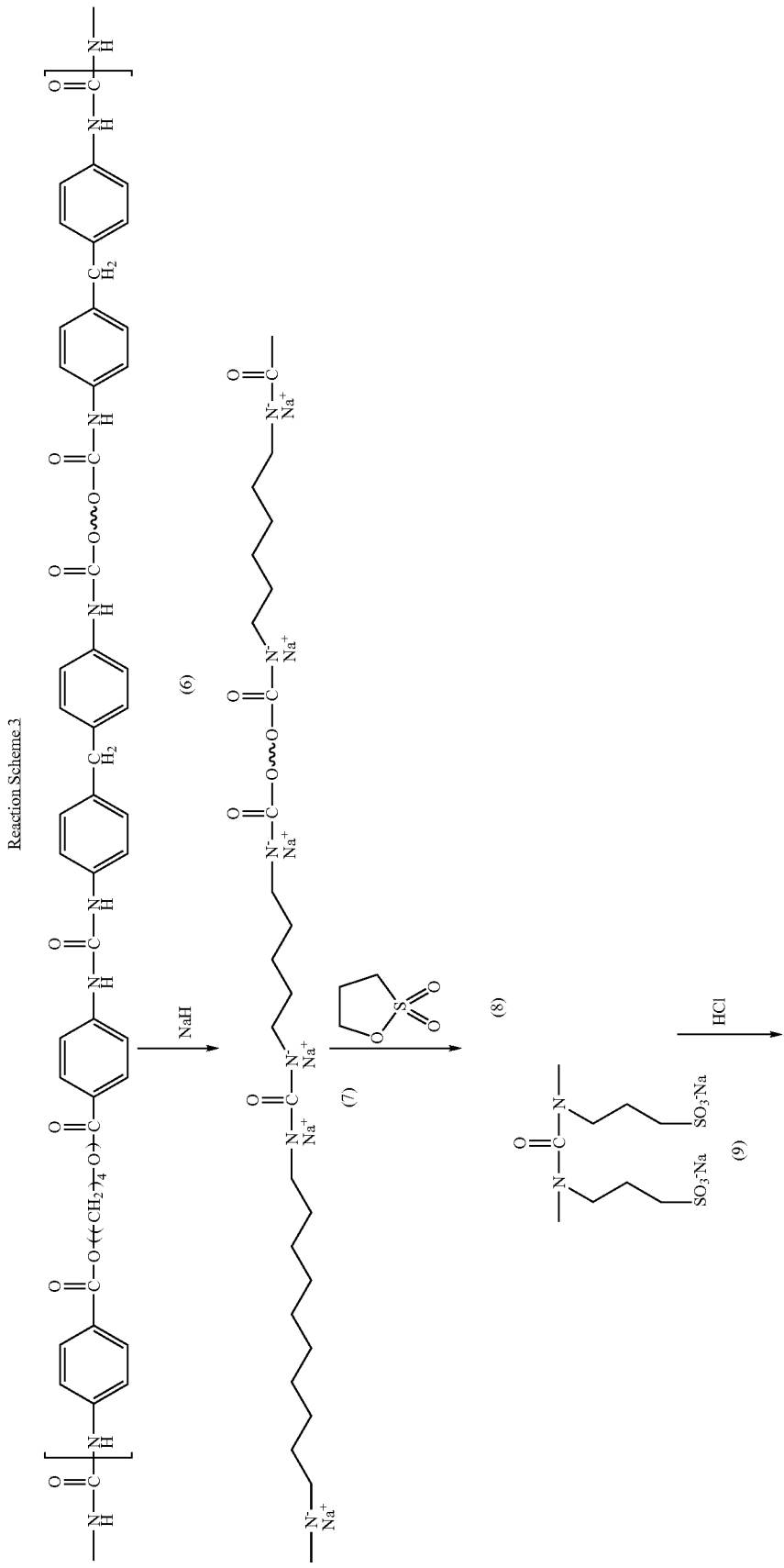

-continued
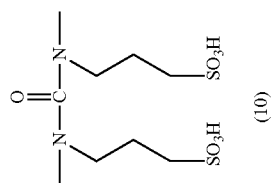
(10)

When the active hydrogen group is a hydroxyl group, it may be bound to a polyoxyalkylene chain. Examples of the polyoxyalkylene chain may include, but are not limited to a polyethyleneoxide chain, a polypropyleneoxide chain, and a polytetramethyleneoxide chain. A polyethyleneoxide chain or a polytetramethyleneoxide chain are preferable because of their proton conductivity and physical properties. An example of the reaction that introduces a polyoxyalkylene chain is shown in Reaction Scheme 4. In this case, the acryl isocyanate compound 12 is chemically bound to the polyurea resin 11, and then a terminal carbon double bond of the chemically bound acryl isocyanate compound is polymerized with a branched acrylate 13 that has ethyleneoxide chains.

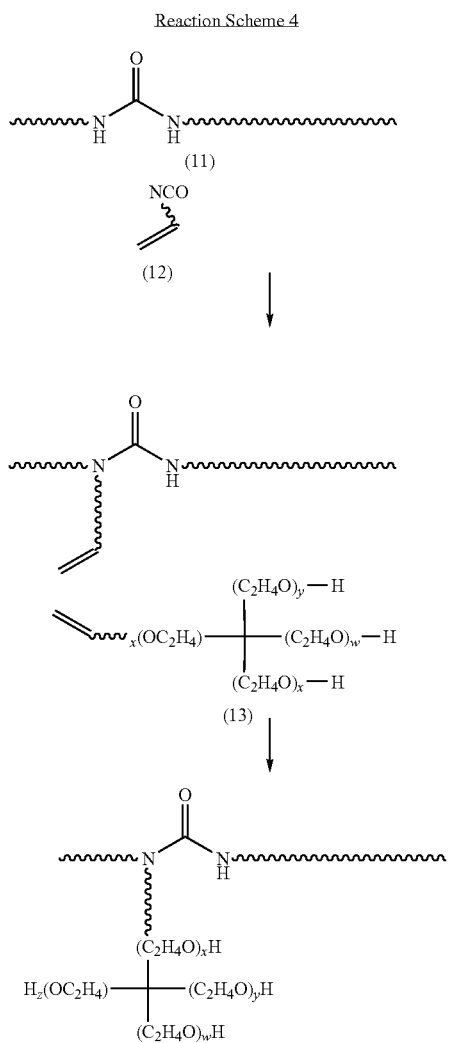

In the above compounds, each of x, y, z, and w is a number between 1 and 100.

Another example of the reaction of introducing a polyoxyalkylene chain is shown in Reaction Scheme 5. In this case, the acryl isocyanate compound 12 is chemically bound to the polyurea resin 11, and then a terminal carbon double bond of the chemically bound acryl isocyanate compound is polymerized with a polyfunctional acrylate 14 and a branched acrylate 13 that has ethyleneoxide chains.

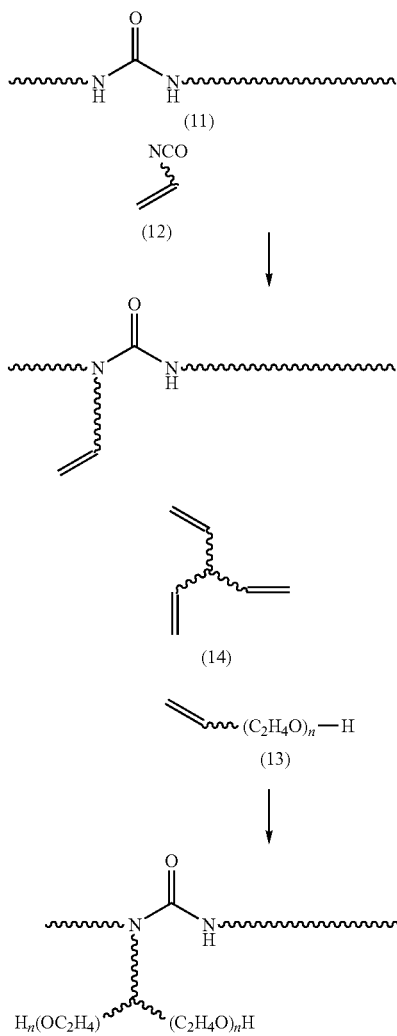

In the above compounds, n is a number between 1 and 100.

The electrolyte membrane of a fuel cell of the present invention may have a pyrolysis temperature of 180° C. or higher and a storage modulus at 150° C. ranging from about $1 \times 10^7$ Pa to $1 \times 10^9$ Pa. When the values are out of these ranges, preferable heat resistance and mechanical properties may not be obtained.

A fuel cell according to an exemplary embodiment of the present invention will now be described in more detail.

The fuel cell includes a proton conductive electrolyte membrane and a cathode and an anode that are coupled with both sides of the electrolyte membrane. In the anode, hydrogen from a fuel is electrochemically oxidized to produce protons and electrons. The protons are transferred to the cathode through the electrolyte membrane by an external load that is coupled with the fuel cell. In the cathode, the protons, oxygen and the electrons react to produce water.

The electrodes for the fuel cell may comprise a conductive material, a binder, and a catalyst. The conductive material may be any electroconductive material such as various metals and carbon materials including carbon black, acetylene black, activated carbon, and graphite, for example. These materials may be used alone or in combination.

It is preferable to use the proton conducting resin of the present invention as the binder. The binder may include other resins in addition to the proton conducting resin. For example, a fluorine resin may be added as a water repellent. Preferably, a fluorine resin that has a melting point of 400° C. or lower such as polytetrafluoroethylene, tetrafluoroethylene-perfluoroalkylvinylether copolymer, and the like may be used.

The catalyst may be any metal that is capable of promoting oxidization of hydrogen and reduction of oxygen. Examples of such metals may include, but are not limited to lead, iron, manganese, cobalt, chromium, gallium, vanadium, tungsten, ruthenium, indium, palladium, platinum, rhodium, and alloys thereof.

In the fuel cell of the present invention, at least one of the cathode and the anode includes the proton conducting resin that has a backbone comprising a polyurea resin and side chains comprising an active hydrogen group at a terminal.

EXAMPLES

The present invention will now be described in greater detail with reference to the following examples. The following examples are for illustrative purposes only and are not intended to limit the scope of the invention.

The experimental conditions for measurement of the physical properties that are studied in following examples are as follows.

Proton conductivity: Two Pt wires (diameter: 0.2 mm) were placed 5 mm apart on the surface of an electrolyte membrane (2 cm×2 cm) to form electrodes. When AC (1 kHz) was applied to the electrodes, a resistance was measured with an impedance analyzer. The proton conductivity was calculated by an equation $1/(R \times t \times D)$ where R is the resistance gradient, t is the thickness of the electrolyte membrane, and D is the width of the electrolyte membrane. The measurement of the proton conductivity was conducted at 80° C. and humidity of 95%.

Storage modulus: The measurement was conducted using a viscoelasticity meter (Rheogel-E4000, UBM) at a heating rate of 2° C./min, a temperature range of 20-300° C., a frequency of 100 Hz, and a displacement of 5 μm.

Pyrolysis temperature: The measurement was conducted using a thermal analysis system (WS002, Max Science) at a heating rate of 5° C./min.

Example 1

20.8 parts by weight of MDI and 100 parts by weight of polytetramethyleneoxide-di-P-aminobenzoate (amine value: 89) were mixed and dissolved in 400 parts by weight of tetrahydtofuran (THF). The resulting solution was injected into a fluorine-based schale and THF was removed, thereby obtaining the polyurea resin.

1 g of the obtained polyurea resin was dissolved in 10 mL of THF and 0.4 g of MOI (2-isocyanatoethyl methacrylate) and 0.002 g of dibutyl tin dilaurylate were added thereto and reacted at room temperature. The isocyanate group was observed to have disappeared. The resulting solution, 1 part by weight of TBAS (50 wt % aqueous solution), 0.002 part by weight of 2-hydroxy-2-methylpropiophenone as a polymerization initiator, and 6 parts by weight of THF were mixed and degassed. Then, the mixture was irradiated with ultraviolet rays (400 W) for 7 minutes. Thereafter, the resulting compound was washed with hot water (80° C.) for 1 hour and dried. Thus, the proton conducting electrolyte of Example 1 was prepared.

The proton conducting resin was formed into a sheet to obtain an electrolyte membrane. The proton conductivity of the electrolyte membrane was $4 \times 10^{-4}$ S/cm.

Example 2

A polyurea resin was prepared in the same manner as in Example 1.

1 g of the obtained polyurea resin was dissolved in 10 mL of THF and 0.4 g of MOI and 0.002 g of dibutyl tin dilaurylate were added thereto and reacted at room temperature. The isocyanate group was observed to have disappeared. The resulting solution, 1.18 parts by weight of polyethylene glycol 400 monoacrylate, 0.002 part by weight of 2-hydroxy-2-methylpropiophenone as a polymerization initiator, and 6 parts by weight of THF were mixed and degassed. Then, the mixture was irradiated with ultra violet rays (400 W) for 7 minutes. Thereafter, the resulting compound was washed with hot water (80° C.) for 1 hour and dried. Thus, the proton conducting electrolyte of Example 2 was prepared.

The proton conducting resin was formed into a sheet to obtain an electrolyte membrane. The proton conductivity of the electrolyte membrane was $8 \times 10^{-3}$ S/cm.

Example 3

A polyurea resin was prepared in the same manner as in Example 1.

2.5 g of the obtained polyurea resin was dissolved in 50 mL of dimethylformamide (DMF) and placed in a reaction vessel. The reaction vessel was purged with nitrogen. Then, 195 mg of NaH with purity of 60% was added to the reaction vessel and reacted at −5° C. for 15 min. Thereafter, a solution of 360 mg of 1,3-propanesultone in 5 mL of DMF was added and reacted at 50° C. for 2 hours. The resulting compound was filtered and transferred to 300 mL of diethylether to precipitate a polymer. Water was removed using a centrifuge. The polymer was dissolved again in 5 mL of DMF and added to 200 mL of 15 vol % HCl solution to perform proton exchange. The resulting compound was washed, dried, and then dissolved in THF. The solution was cast on a schale, dried, washed with hot water, and then dried again to obtain the proton conducting resin of Example 3.

The proton conducting resin was formed into a sheet to obtain an electrolyte membrane. The proton conductivity of the electrolyte membrane was $5.4 \times 10^{-4}$ S/cm.

The pyrolysis temperature of the proton conducting resin was 230° C. and the storage modulus at 150° C. was $1.0 \times 10^8$ Pa.

Example 4

0.5 g of each of the proton conducting resins of Examples 2 and 3 was dissolved in THF and cast on a schale to obtain the electrolyte membrane of Example 4. The proton conductivity of these electrolyte membranes was $5.4 \times 10^{-4}$ S/cm to $8 \times 10^{-3}$ S/cm.

Comparative Example 1

A polyurea resin was prepared in the same manner as in Example 1.

The polyurea resin was dissolved in THF and cast on a schale to obtain the electrolyte membrane of Comparative Example 1. The proton conductivity of the electrolyte membrane was $3 \times 10^{-6}$ S/cm.

The experimental results indicate that the electrolyte membranes of Example 1, Example 2, Example 3, and Example 4 have significantly improved proton conductivity compared to the electrolyte membrane of Comparative Example 1.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An electrolyte for a fuel cell, comprising:
   a proton conducting resin,
   wherein the proton conducting resin comprises a backbone comprising a polyurea resin and side chains that comprise an active hydrogen group at respective terminals thereof,
   wherein an acryl isocyanate compound is bound to at least one of a urea group and a urethane group in the polyurea resin,
   wherein the active hydrogen group is bound to the acryl isocyanate compound, and
   wherein a sultone compound is bound to at least one of a urea group and a urethane group in the polyurea resin.

2. The electrolyte of claim 1,
   wherein the active hydrogen group is at least one selected from the group consisting of a sulfonic acid group, a carboxylic acid group, a phosphoric acid group, and a hydroxyl group.

3. The electrolyte of claim 2, wherein the hydroxyl group is bound to a polyoxyalkylene chain.

4. The electrolyte of claim 1,
   wherein a pyrolysis temperature of the electrolyte is about 180° C. or higher, and
   wherein a storage modulus of the electrolyte at 150° C. ranges from about $1 \times 10^7$ Pa to about $1 \times 10^9$ Pa.

5. A fuel cell, comprising:
   a cathode;
   an anode; and
   an electrolyte interposed between the cathode and the anode,
   wherein the electrolyte comprises a proton conducting resin, and
   wherein the proton conducting resin comprises a backbone that comprises a polyurea resin and side chains that comprise an active hydrogen group at respective terminals thereof,
   wherein an acryl isocyanate compound is bound to at least one of a urea group and a urethane group in the polyurea resin,
   wherein the active hydrogen group is bound to the acryl isocyanate compound, and
   wherein a sultone compound is bound to at least one of a urea group and a urethane group in the polyurea resin.

6. The fuel cell of claim 5,
   wherein at least one of the cathode and the anode comprises the electrolyte comprising the proton conducting resin.

7. The fuel cell of claim 5,
   wherein the active hydrogen group is at least one selected from the group consisting of a sulfonic acid group, a carboxylic acid group, a phosphoric acid group, and a hydroxyl group.

8. The fuel cell of claim 7,
   wherein the hydroxyl group is bound to a polyoxyalkylene chain.

9. The fuel cell of claim 5,
   wherein the electrolyte has a pyrolysis temperature of about 180° C. or higher, and
   wherein the electrolyte has a storage modulus at 150° C. that ranges from about $1 \times 10^7$ Pa to about $1 \times 10^9$ Pa.

* * * * *

UNITED STATES PATENT AND TRADEMARK OFFICE
CERTIFICATE OF CORRECTION

PATENT NO. : 7,648,790 B2
APPLICATION NO. : 11/188780
DATED : January 19, 2010
INVENTOR(S) : Sonai et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1211 days.

Signed and Sealed this

Twenty-third Day of November, 2010

David J. Kappos
*Director of the United States Patent and Trademark Office*